United States Patent
Swisher et al.

(10) Patent No.: US 12,223,722 B2
(45) Date of Patent: Feb. 11, 2025

(54) PERSON IDENTIFICATION SYSTEMS AND METHODS

(71) Applicant: KONINKLIJKE PHILIPS N.V., Eindhoven (NL)

(72) Inventors: Christine Menking Swisher, San Diego, CA (US); Purnima Rajan, Eindhoven (NL); Asif Rahman, Brookline, MA (US); Bryan Conroy, Garden City South, NY (US)

(73) Assignee: Koninklijke Philips N.V., Eindhoven (NL)

( * ) Notice: Subject to any disclaimer, the term of this patent is extended or adjusted under 35 U.S.C. 154(b) by 507 days.

(21) Appl. No.: 17/057,353

(22) PCT Filed: May 25, 2018

(86) PCT No.: PCT/EP2018/063852
§ 371 (c)(1),
(2) Date: Nov. 20, 2020

(87) PCT Pub. No.: WO2019/223885
PCT Pub. Date: Nov. 28, 2019

(65) Prior Publication Data
US 2021/0192270 A1    Jun. 24, 2021

(51) Int. Cl.
*G06K 9/00* (2022.01)
*G06F 18/22* (2023.01)
(Continued)

(52) U.S. Cl.
CPC .............. *G06V 20/52* (2022.01); *G06F 18/22* (2023.01); *G06V 10/26* (2022.01)

(58) Field of Classification Search
None
See application file for complete search history.

(56) References Cited

U.S. PATENT DOCUMENTS 9,125,606 B2  9/2015  Verkruijsse
9,615,749 B2  4/2017  Clifton
(Continued)

OTHER PUBLICATIONS

Sunderrajan et al., "Context-award hypergraph modeling for re-identification and summarization", Jan. 2016 (Year: 2016).*
(Continued)

*Primary Examiner* — SJ Park

(57) ABSTRACT

Techniques disclosed herein relate to identifying individuals in digital images. In some embodiments, a digital image may be acquired (802) that captures an environment containing at least a first subject. A first portion of the digital image depicting the first subject may be segmented (806) into a plurality of superpixels. For each superpixel of the plurality of superpixels: a semantic label may be assigned (810) to the superpixel; features of the superpixel may be extracted (812); and a measure of similarity between the features extracted from the superpixel and features extracted from a reference superpixel identified in a reference digital image may be determined (814), wherein the reference superpixel has a reference semantic label that matches the semantic label assigned to the superpixel. Based on the measures of similarity associated with the plurality of superpixels, it may be determined (818) that the first subject is depicted in the reference image.

15 Claims, 10 Drawing Sheets

(51) Int. Cl.
*G06V 10/26* (2022.01)
*G06V 20/52* (2022.01)

(56) References Cited

U.S. PATENT DOCUMENTS

| | | |
|---|---|---|
| 2007/0237355 A1 | 10/2007 | Song |
| 2013/0243307 A1 | 9/2013 | Winter |
| 2014/0139656 A1 | 5/2014 | Jeanne |
| 2014/0148663 A1 | 5/2014 | Bresch |
| 2014/0192177 A1 | 7/2014 | Bartula |
| 2014/0235976 A1 | 8/2014 | Bresch |
| 2014/0253709 A1 | 9/2014 | Bresch |
| 2014/0294239 A1 | 10/2014 | Duckett |
| 2018/0300540 A1 | 10/2018 | Swisher |
| 2019/0362137 A1 | 11/2019 | Wang |

OTHER PUBLICATIONS

Salamon et al., "A user-based framework for gropu re-identification in still images", 2015 (Year: 2015).*
Zhao et al., "Understanding humans in crowded scenes: deep nested adversarial learning and a new benchmark for multi-human parsing", Apr. 2018 (Year: 2018).*
Wang et al., "A method of pedestrian re-identification based on multiple salience features", 2017 (Year: 2017).*
International Search Report Feb. 25, 2019.
Yihang Bo et al: "Shape-Based Pedestrian Parsing", Computer Vision and Pattern Recognition (CVPR), 2011 IEEE Conference On, IEEE, Jun. 20, 2011 (Jun. 20, 2011), pp. 2265-2272, XP032038111, DOI: 10.1109/CVPR.2011.5995609 ISBN: 978-1-4577-0394-2 abstract.
Curtis, D. et al: "Physiological Signal Monitoring in the Waiting Areas of an Emergency Room", Proceedings of the ICST 3rd International Conference On Body Area Networks, 2008, pp. 1-8, XP002788844, Tempe, Arizona the whole document.
Gallagher A.C. et al: "Clothing Cosegmentation for Recognizing People", Computer Vision and Pattern Recognition, 2008. CVPR 2008. IEEE Conference On, IEEE, Piscataway, NJ, USA, Jun. 23, 2008 (Jun. 23, 2008), pp. 1-8, XP031297039, ISBN: 978-1-4244-2242-5 section 3.
Luo Ping et al: "Pedestrian Parsing Via Deep Decompositional Network", 2013 IEEE International Conference On Computer Vision, IEEE, Dec. 1, 2013 (Dec. 1, 2013), pp. 2648-2655, XP032573018, ISSN: 1550-5499, DOI: 10.1109/ICCV.2013.329 [retrieved on Feb. 28, 2014] the whole document.
"Privacy Preserving Crowd Monitoring: Counting People Without People Models or Tracking", Antoni B. Chang et al., In Conference Paper in Proceedings / CVPR, IEEE Computer Society Conference on Computer Vision and Pattern Recognition. IEEE Computer Society Conference on Computer Vision and Pattern Recognition— Jun. 2008.
Sunderrajan, S. et al., "Context-Aware Hypergraph Modeling for Re-identification and Summarization", IEEE Transactions On Multimedia, vol. 18, No. 1, pp. 51-63, Jan. 31, 2016.
Salamon, N.Z. et al., "A user-based framework for group re-identification in still images", IEEE International Symposium on Multimedia, pp. 315-318, 2015.

* cited by examiner

PERSON IDENTIFICATION SYSTEMS AND METHODS

CROSS-REFERENCE TO PRIOR APPLICATIONS

This application is the U.S. National Phase application under 35 U.S.C. § 371 of International Application No. PCT/EP2018/063852 filed on May 25, 2018. These applications are hereby incorporated by reference herein.

TECHNICAL FIELD

The present disclosure is directed generally, but not exclusively, to identifying people in digital images. More particularly, but not exclusively, various methods and apparatus disclosed herein relate to identifying people in digital images using a combination of features such as clothing, accessories, hair, facial features, and so forth.

BACKGROUND

There are a number of scenarios in which it may be desirable to automatically identify people based on digital images that capture scenes containing the people. For example, when patients visit the hospital, they typically are registered, triaged, and then sent to an area such as a waiting room to wait for hospital resources such as physicians to become available to examine and/or treat the patients. Being able to automatically identify individual patients may be helpful for continuing to monitor their conditions (e.g., for deterioration) while they wait for allocation of medical resources. It may also be helpful for determining if/when patients left without being seen (LWBS). Automatically identifying people based on digital images may also be useful in a variety of other contexts, such as airports, border crossings, gyms and fitness centers, various businesses, etc.

While identifying people is possible using facial recognition (e.g., via a classifier), it may require that the digital images under analysis be of a relatively high resolution so that facial features (e.g., eyes, nose, mouth, etc.) are discernable. Additionally, in a context such as a waiting room in which a mounted camera may acquire the digital images to be analyzed, there is no guarantee (and indeed it may be unlikely) that the waiting patients are positioned in a manner conducive to facial recognition, e.g., because their faces may not be fully visible and/or may be partially or completely obstructed (e.g., by a book, magazine, smartphone, etc.).

SUMMARY

The present disclosure is directed to methods, systems, and apparatus for automatically identifying people depicted in acquired digital images. As one non-limiting example, a plurality of triaged patients may wait in a waiting room until they can be seen by an emergency medicine physician. The patients may be included in a patient monitoring queue (also referred to simply as a "patient queue") that is ordered or ranked, for instance, based on a measure of acuity associated with each patient (referred to herein as a "patient acuity measure") that is determined based on information obtained/acquired from the patient by a triage nurse, as well as other data points such as patient waiting time, patient presence, etc. One or more "vital sign acquisition cameras" mounted in the waiting room may be configured to periodically perform contactless and/or unobtrusive acquisition of one or more updated vital signs and/or physiological parameters from each patient. These updated vital signs and/or physiological parameters may include but are not limited to temperature, pulse, oxygen saturation ("$SpO_2$"), respiration rate, posture, perspiration and so forth. In order to identify a particular patient from which the vital sign acquisition cameras should acquire updated vital signs, techniques described herein may be employed to match a so-called "reference" digital image—which may in some embodiments be a digital image acquired of the patient during registration and/or triage—to a person contained in a scene captured by a relatively low resolution digital image acquired by one or more vital sign acquisition cameras, e.g., from a relatively wide field of view ("FOV"). More generally, techniques described herein may be implemented in various contexts to identify subjects depicted in digital images (e.g., single images and/or stream of digital images, such as video feeds), e.g., by matching features extracted from superpixels generated from those subjects with features extracted from reference superpixels generated from reference digital images (e.g., acquired at registration, acquired at checkin to an airport or train station, photo identification, etc.).

Generally, in one aspect, a method may include: acquiring, by one or more processors, a digital image that captures an environment containing at least a first subject; segmenting, by one or more of the processors, a first portion of the digital image depicting the first subject into a plurality of superpixels; for each superpixel of the plurality of superpixels: assigning, by one or more of the processors, a semantic label to the superpixel, extracting, by one or more of the processors, features of the superpixel, determining, by one or more of the processors, a measure of similarity between the features extracted from the superpixel and features extracted from a reference superpixel identified in a reference digital image, wherein the reference superpixel has a reference semantic label that matches the semantic label assigned to the superpixel; and determining, by one or more of the processors, based on the measures of similarity associated with the plurality of superpixels, that the first subject is depicted in the reference image.

In various embodiments, the digital image may capture a scene containing multiple subjects that includes the first subject. The method may further include segmenting the digital image into a plurality of portions that each depicts a different subject of the plurality of subjects. In various embodiments, the digital image may be segmented into the plurality of portions by instance segmenting the plurality of subjects contained in the digital image into a mask. In various implementations, cuts of the mask may be used to separate the mask into discrete sub-mask, wherein each sub-mask corresponds to an individual subject of the plurality of subjects.

In various embodiments, the digital image may be segmented into the plurality of portions using pose estimation. In various embodiments, at least one of the plurality of superpixels may be assigned a semantic label that is associated with clothing worn over human torsos.

In various embodiments, the method may further include determining, by one or more of the processors, based on one or more of the measures of similarity associated with the plurality of superpixels, a likelihood that the first subject altered clothing worn over a torso of the first subject during a time interval between when the reference digital image was captured and when the digital image was captured.

In various embodiments, at least one of the plurality of superpixels may be assigned a semantic label that is associated with clothing worn over human legs. In various embodiments, at least one of the plurality of superpixels may be assigned a semantic label that is associated with human hair. In various embodiments, at least one of the plurality of superpixels may be assigned a semantic label that is associated with human faces.

In various embodiments, the method may further include determining, by one or more of the processors, based on the measures of similarity associated with the plurality of superpixels: a first likelihood that an appearance of the first subject was altered during a time interval between when the reference digital image was captured and when the digital image was captured, and a second likelihood that the first subject left the environment. In various embodiments, the environment may take the form of a hospital waiting room, a gym, or an airport.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Figure 1:
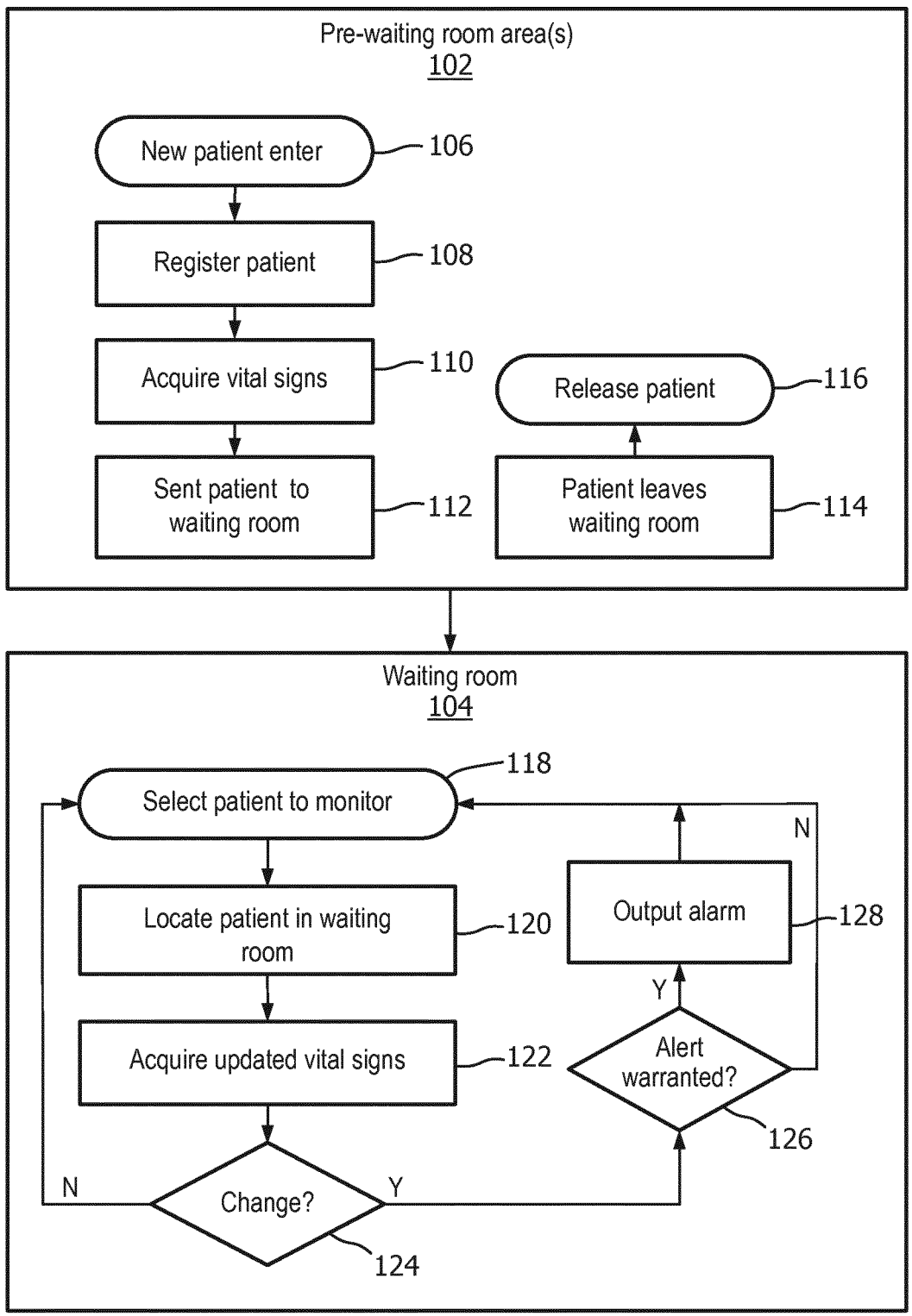
FIG. 1 schematically illustrates a general process flow for monitoring patients identified in digital images using disclosed techniques, in accordance with various embodiments.

FIG. 1 schematically illustrates generally how patients may be monitored using disclosed techniques. In particular, operations and actions are depicted that may occur in a pre-waiting room area, such as at a pre-waiting room area(s) 102, which may include reception and/or registration, and/or a triage station or booth. In addition, operations and actions are depicted that may occur in a waiting room 104. At block 106, a new patient may enter and/or approach pre-waiting room area(s) 102, e.g., after checking in at a reception desk (not depicted).

At block 108, the new patient may be registered. Registration may include, for instance, collecting information about the patient such as the patient's name, age, gender, insurance information, and reason for visit. Typically, but not exclusively, this information may be manually input into a computer by medical personnel such as a triage nurse. In some embodiments, one or more reference images of the patient may be acquired, e.g., by a camera that is integral with a computing device operated by the triage nurse, by a standalone camera, and/or by a vital sign acquisition camera (in which case at least some vital signs may be optionally acquired at registration). In many instances, the triage nurse additionally may acquire various initial vital signs and/or physiological parameters at block 110 using various medical instruments. These initial vital signs and/or physiological parameters may include but are not limited to blood pressure, pulse, glucose level, $SO_2$, photoplethysmogram ("PPG"), respiration rate (e.g., breathing rate), temperature, skin color, and so forth. While not depicted in FIG. 1, in some embodiments, other information may be gathered at triage as well, such as acquiring/updating a patient's medical history, determining patient allergies, determining patient's use of medications, and so forth.

Once the patient is registered and their initial vital signs and/or physiological parameters acquired, at block 112, the patient may be sent to waiting room 104. In some embodiments, the patient may be assigned a so-called "patient acuity measure," which may be a measure that is used to rank a severity of the patient's ailment, and in some instances may indicate an anticipated need for emergency room resources. Any number of commonly used indicators and/or clinician decision support ("CDS") algorithms may be used to determine and/or assign a patient acuity measure, including but not limited to the Emergency Severity Index ("ESI"), the Taiwan Triage System ("TTS"), the Canadian Triage and Acuity Scale ("CTAS"), and so forth. For example, in some embodiments, vital signs of the patient may be compared with predefined vital sign thresholds stored in a system database, or with published or known vital sign values typical for a given patient age, gender, weight, etc., to determine the patient's initial patient acuity measure and/or the patient's initial position in the patient queue. In some embodiments, various physiological and other information about the patient may be applied as input across a trained model (e.g., regression model, neural network, deep learning network, etc.), case-based reasoning algorithm, or other clinical reasoning algorithm to derive one or more acuity measures. In some embodiments, the information used for deriving the acuity measure may include or even be wholly limited to vitals or other information that may be captured by the vital sign acquisition camera. In some embodiments, the information used for deriving the acuity measure may alternatively or additionally include information such as information from a previous electronic medical record (EMR) of the patient, information acquired from the patient at triage, information from wearable devices or other sensors carried by the patient, information about other patients or people in the waiting room (e.g., vitals of others in the room), information about family members or others associated with the patient (e.g., family member EMRs), etc.

At block 114, it may be determined, e.g., using one or more cameras, sensors, or input from medical personnel, that a patient has left the waiting room. Block 114 may include scanning each person currently within the waiting room (e.g., as part of a seeking function that attempts to locate the patient once the patient is at top of a queue of patients for which vitals are to be captured, such as an execution of block 120 described below, or cycling through each person in the room to capture vitals, as multiple executions of the loop including blocks 118 and 120 described below) and determining that the patient was not located. In some embodiments, the system may wait until a predetermined number of instances of the patient missing is reached or a predetermined amount of time has passed during which the patient is missing before the patient is deemed to have left the waiting room to account for temporary absences (e.g., visiting the restroom or speaking with clinical staff in a triage room). For example, the patient may have been admitted to the emergency department (ED). Or the patient's condition may have improved while they waited, causing them to leave the hospital. Or the patient may have become impatient and left to seek care elsewhere. Whatever the reason, once it is determined that the patient has left the waiting room for at least a threshold amount of time, at block 116, the patient may be deemed to have left without being seen and may be released from the system, e.g., by removing them from a queue in which registered patients are entered.

At block 118, a patient in waiting room 104 may be selected for monitoring. For example, in some embodiments, a database storing registration information obtained at blocks 108-110 may be searched to select a patient having the highest patient acuity measure or a patient having the highest acuity measured that has not been monitored recently, as may be determined by a time threshold set for all patients or set (e.g., inversely correlated) based on the acuity measure. In other embodiments, registration information associated with a plurality of patients in waiting room may be ranked in a patient monitoring queue, e.g., by their respective patient acuity measures, in addition to or instead of other measures such as waiting times, patient presence in the waiting room (e.g., missing patients may be selected for monitoring more frequently to determine whether they should be released if repeatedly absent), etc. In yet other embodiments, patient acuity measures may not be considered when ranking the patient monitoring queue, and instead only considerations of patient waiting times, patient presence, etc., may be considered.

However such a patient monitoring queue is ranked, in some embodiments, the first patient in the queue may be selected as the one to be monitored next. It is not required (though it is possible) that the patient monitoring queue be stored in sequence of physical memory locations ordered by patient acuity measures. Rather, in some embodiments, a ranked patient monitoring queue may merely include a rank or priority level value associated with each patient. In other words, a "patient monitoring queue" as described herein may refer to a "logical" queue that is logically ranked based on patient acuity measures, waiting time etc., not necessarily a contiguous sequence of memory locations. Patients may be selected for monitoring at block 118 in an order of their respective ranking in the patient monitoring queue.

At block 120, the patient selected at block 118 may be located in waiting room 104. In various embodiments, one or more vital sign acquisition cameras (not depicted in FIG. 1, see FIGS. 2, and 3) deployed in or near waiting room 104 may be operated (e.g., panned, tilted, zoomed, etc.) to acquire one or more digital images of patients in waiting room 104. Those acquired digital images may be analyzed to match various visual features of the patients to visual features of one or more reference patient images captured during registration at block 108. Visual features of patients that may be matched to corresponding features of patient images include but are not limited to faces, shape (e.g., physique), hair, clothing, torsos, accessories (e.g., hats, purses, jewelry, etc.), and so forth. As will be described in greater detail below, various techniques may be applied to digital images captured by one or more vital sign acquisition cameras to locate a selected patient. These techniques may include edge detection, contour detection, histograms, segmentation, area calculation, parsing, localization, machine learning model(s) (e.g., convolutional neural networks), and so forth. By employing these techniques as described below—particularly with respect to identifying patients using multiple different features—in various embodiments, a technical advantage is achieved in that a vital sign acquisition camera with a relatively large FOV may capture a scene in a relatively low resolution digital image. The relatively low resolution digital image may be quickly analyzed to identify one or patients by comparing various visual features with visual features of the aforementioned reference images obtained at registration/triage.

At block 122, one or more vital sign acquisition cameras mounted or otherwise deployed in or near waiting room 104 may be operated to perform unobtrusive (e.g., contactless) acquisition of one or more updated vital signs and/or physiological parameters from the patient selected at block 118 and located at block 120. These vital sign acquisition cameras may be configured to acquire (without physically contacting the patient) a variety of different vital signs and/or physiological parameters from the patient, including but not limited to blood pressure, pulse (or heart rate), skin color, respiratory rate, PPG, $SpO_2$, temperature, posture, sweat levels, and so forth. In some embodiments, vital sign acquisition cameras may be equipped to perform so-called "contactless methods" to acquire vital signs and/or extract physiological information from a patient may be used as medical image devices. Non-limiting examples of such cameras are described in United States Patent Application Publication Nos. 20140192177A1, 20140139656A1, 20140148663A1, 20140253709A1, 20140235976A1, and U.S. Pat. No. 9,125,606B2, which are incorporated herein by reference for all purposes.

At block 124, it may be determined, e.g., by one or more components depicted in FIG. 2 (described below), based on a comparison of the updated vital sign(s) and/or physiological parameters acquired at block 122 to previously-acquired vital signs and/or physiological parameters (e.g., the initial vital signs acquired at block 110 or a previous iteration of updated vital signs/physiological parameters acquired by the vital sign acquisition cameras), whether the patient's condition has changed. For example, it may be determined whether the patient's pulse, respiratory rate, blood pressure, $SpO_2$, PPG, temperature, etc. has increased or decreased while the patient has waited. If the answer is no, then control may proceed back to block 118, and a new patient (e.g., the patient with the next highest patient acuity measure) may be selected and control may proceed back to block 120. However, if the answer at block 124 is yes (i.e. the patient's condition has changed), then control may pass to block 126. In some embodiments, the patient's condition may be represented (at least partially) by the same acuity measure used for purposes of determining monitoring order.

At block 126, it may be determined (again, by one or more components of FIG. 2) whether a medical alert is warranted based on the change detected at block 124. For example, it may be determined whether a change in one or more vital signs or patient acuity measures satisfies one or more thresholds (e.g., has blood pressure increased above a level that is considered safe for this particular patient?). If the answer is yes, then control may pass to block 128. At block 128, an alarm may be output, e.g., to a duty nurse or other medical personnel, that the patient is deteriorating. The medical personnel may then check on the patient to determine if remedial action, such as immediately admitting the patient or sending the patient to a doctor, is warranted. In some embodiments, control may then pass back to block 118. However, if the answer at block 126 is no, then in some embodiments, control may pass back to block 118.

Figure 2:
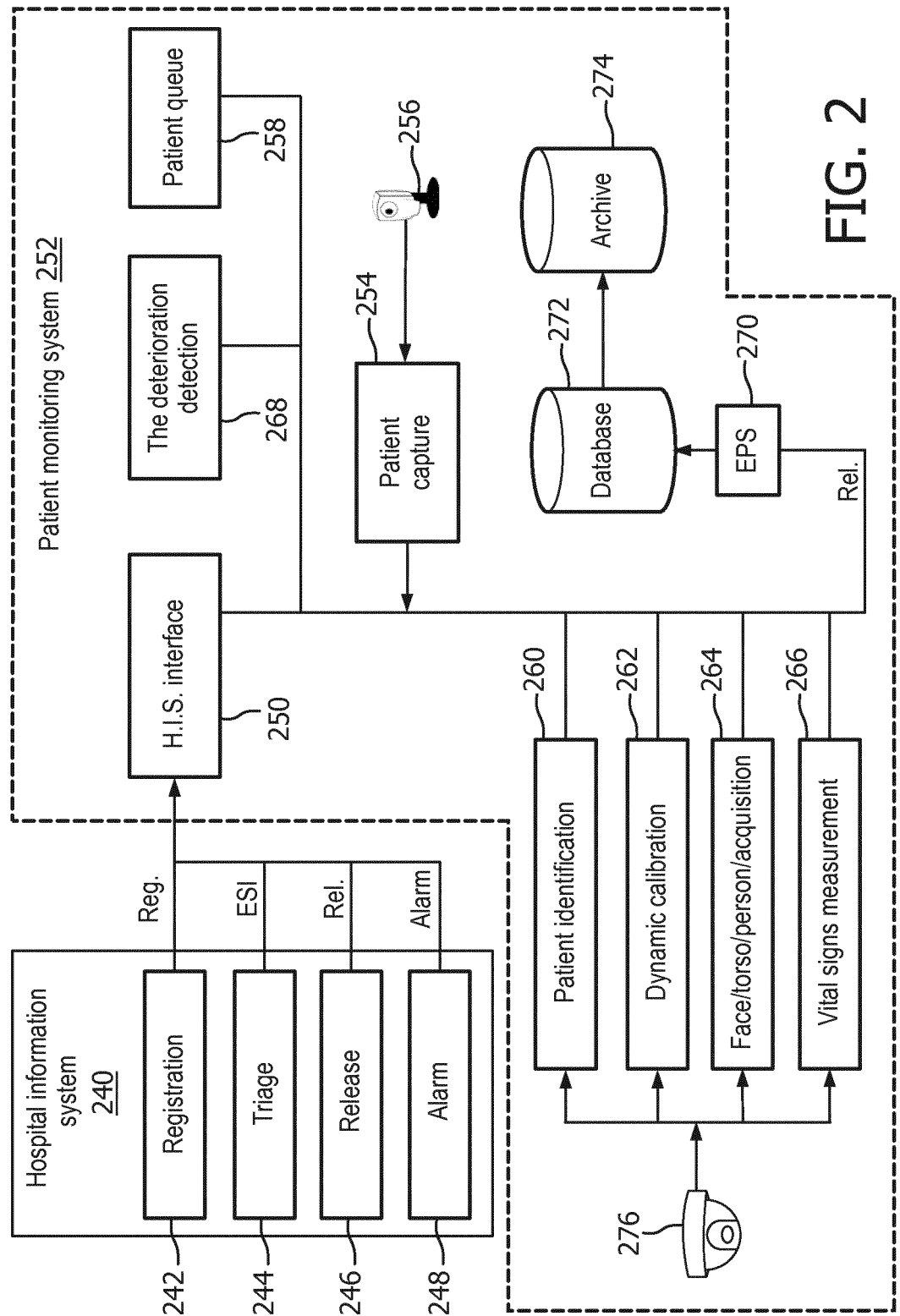
FIG. 2 illustrates an example environment in which various components of the present disclosure may implement selected aspects of the present disclosure, in accordance with various implementations.

FIG. 2 depicts example components that may be used to practice disclosed techniques, in accordance with various embodiments. A hospital information system 240 may be of the type that is commonly found in hospitals, doctor's offices, and so forth. Hospital information system 240 may be implemented using one or more computing systems that may or may not be connected via one or more computer networks (not depicted). Hospital information system 240 may include, among other things, a registration module 242, a triage module 244, a release module 246, and an alarm module 248. One or more of modules 242-248, or any other module or engine described herein, may be implemented using any combination of hardware and software, including one or more microprocessors executing instructions stored in memory, on a "cloud"-based computing infrastructure, etc. For example, the registration module 242 may include registration instructions implementing the functionality described herein in connection with registration executing on a processor while the triage module 244 may include triage instructions implementing the functionality described herein in connection with triage executing on the same processor. Similar underlying hardware and software may be used to implement other "modules" described herein.

Registration module 242 may be configured to receive, e.g., as manual input from a duty nurse, registration information of new patients. This may include, for instance, the patient's name, age, insurance information, and so forth. Triage module 244 may be configured to receive, e.g., as manual input from a duty nurse or directly from networked medical equipment, vital signs such as those described above and/or other physiological data, such as weight, height, the patient's reason for the visit, etc. In various embodiments, vital signs received by triage module 244 and/or a patient acuity measure (e.g., ESI in FIG. 2) may be associated with corresponding patient information received by registration module 242, e.g., in one or more databases (not depicted) associated with hospital information system 240.

Alarm module 248 may be configured to receive information indicative of various events, such as patient deterioration, and raise various alarms and/or alerts in response. These alarms and/or alerts may be output using a variety of modalities, including but not limited to visual output (e.g., on display screens visible to hospital personnel), intercom announcements, text messages, emails, audio alerts, haptic alerts, pages, pop-up windows, flashing lights, and so forth. Modules 242-248 of hospital information system 240 may be operably coupled, e.g., via one or computer networks (not depicted), to a hospital information system interface 250 ("H.I.S. Interface" in FIG. 2).

Hospital information system interface 250 may serve as an interface between the traditional hospital information system 240 and a patient monitoring system 252 configured with selected aspects of the present disclosure. In various embodiments, the hospital information system interface 250 may publish, e.g., to other modules of the patient monitoring system 252, various information about patients such as registration information, patient acuity measures (e.g., ESI), prescribed and/or administered medications, whether a patient has been released, various alarms/alerts, and so forth. As will be described below, in some embodiments, these publications may be provided to an event publish and subscribe ("EPS") module 270, which may then selectively store them in database 272 and/or selectively publish them to other modules of patient monitoring system 252. In some embodiments, hospital information system interface 250 may additionally or alternatively subscribe to one or more alerts or publications provided by other modules. For example, hospital information system interface 250 may subscribe to alerts from deterioration detection module 268, e.g., so that hospital information system interface 250 may notify appropriate components of hospital information system 240, such as alarm module 248, that a patient is deteriorating.

Patient monitoring system 252 may include a variety of components that facilitate monitoring of patients in an area such as waiting room 104 to ensure that patients are served in a manner conducive with their actual medical condition. Patent monitoring system 252 may include, for instance, a patient capture module 254 that interfaces with one or more cameras 256, a patient queue module 258, a patient identification module 260, a dynamic calibration module 262, a face/torso acquisition module 264, a vital signs measurement module 266, a deterioration detection module 268, the aforementioned EPS module 270, and one or more databases 272, 274. As noted above, each of modules 250, 254, and 258-270 may be implemented using any combination of hardware and software. And while these modules are depicted separately, that is not meant to be limiting or to suggest each is implemented on a separate piece of hardware. For example, one or more modules may be combined and/or omitted, and one or more modules may be implemented on one or more computing systems operably connected via one or more computer networks (not depicted, e.g., computing systems that cooperate to form a so-called "cloud"). The lines depicted connecting various components of FIG. 2 may represent communication channels accessible to these components. These communication channels may be implemented using any number of networking or other computer communication technologies, such as one or more buses, Ethernet, Wi-Fi, Bluetooth, Z-Wave, ZigBee, cellular communication, and so forth.

Patient monitoring system 252 may also include one or more vital sign acquisition cameras 276 that are configured to acquire, e.g., from some distance from a patient, one or more vital signs and/or physiological parameters of the patient. Examples of such vital sign acquisition cameras were described above. In various embodiments, a vital sign acquisition camera 276 may be a pan-tilt-zoom ("PTZ") camera that is operable to pan, tilt, and zoom so that different parts of an area such as waiting room 104 are contained within its FOV. Alternatively, stationary wide FOV cameras could be used. In this manner, it is possible to scan the area being monitored to locate different patients, so that updated vital signs and/or physiological parameters may be acquired unobtrusively.

Patient capture module 254 may receive, from one or more cameras 256, one or more signals carrying captured image data of a patient. For example, in some embodiments, patient capture module 254 may receive a video stream from camera 256. Patient capture module 254 may perform image processing (e.g., face detection, segmentation, shape detection to detect human form, etc.) on the video stream to detect when a patient is present, and may capture a reference digital image of the patient in response to the detection. In some embodiments, the reference digital image may be captured at a higher resolution than individual frames of the video stream, although this is not required. In some embodiments, camera 256 may be a standalone camera, such as a webcam, a PTZ camera (e.g., 276), and so forth, that is deployed in or near pre-waiting room area(s) 102. The one or more images captured by camera 256 may be used thereafter as reference digital images that are associated with patients and used later to identify patients in the area being monitored.

Patient queue module 258 may be configured to establish and/or maintain a priority queue, e.g., in a database, of patients in the area being monitored. In various embodiments, the queue may be ordered by various parameters. In some embodiments, patients in the queue may be ranked in order of patient acuity measures (i.e. by priority). For example, the most critical patients may be placed near the front of the queue and less critical patients may be placed near the end of the queue, or vice versa. In some embodiments, updated vital signs may be acquired from patients waiting in the area being monitored, such as waiting room 104, in an order of the queue. In other embodiments, updated vital signs may be acquired from patients in a FIFO or round robin order. In other embodiments, updated vital signs may be acquired from patients in an order that corresponds to a predetermined scan trajectory programmed into vital sign acquisition camera 276 (e.g., scan each row of chairs in order).

Patient identification module 260 may be configured with selected aspects of the present disclosure to use one or more digital images captured by vital sign acquisition camera 276 (or another camera that is not configured to acquire vital signs unobtrusively), in conjunction with one or more reference patient images captured by patient capture module 254, to locate one or more patients in the area being monitored (e.g., waiting room 104). Patient identification module 260 may analyze acquired digital images using various image processing techniques to identify patients using various visual features of patients. These visual features that may be used to recognize patients may include but are not limited to facial features (e.g., facial localization) and non-facial features such clothing, hair, posture, accessories, and so forth. FIGS. 4-8, described below, demonstrate various aspects of various techniques that may be employed as part of recognizing patients, or more generally, subjects, in any context.

In some embodiments, patient identification module 260 may search, either physically with PTZ camera or digitally with a wide FOV camera, an area being monitored for particular patients from which to obtain updated vital signs. For example, patient identification module 260 may search the area being monitored for a patient selected by patient queue module 258, which may be, for instance, the patient in the queue having the highest patient acuity measure. In some embodiments, patient identification module 260 may cause vital sign acquisition camera(s) 276 to scan the area being monitored (e.g., waiting room 104) until the selected patient is identified.

Dynamic calibration module 262 may be configured to track the use of vital sign acquisition camera(s) 276 and calibrate them as needed. For instance, dynamic calibration module 262 may ensure that whenever vital sign acquisition camera 276 is instructed to point to a particular PTZ location, it always points to the same place. PTZ cameras may be in constant or at least frequent motion. Accordingly, their mechanical components may be subject to wear and tear. Small mechanical errors/biases may accumulate and cause vital sign acquisition camera 276 to respond, over time, differently to a given PTZ command. Dynamic calibration module 262 may correct this, for instance, by occasionally running a calibration routine in which landmarks (e.g., indicia such as small stickers on the wall) may be used to train a correction mechanism that will make vital sign acquisition camera 276 respond appropriately.

Once a patient identified by patient queue module 258 is recognized by patient identification module 260, face/torso/person acquisition module 264 may be configured to pan, tilt, and/or zoom one or more vital sign acquisition cameras 276 so that their fields of view capture a desired portion of the patient. For example, in some embodiments, face/torso/person acquisition module 264 may pan, tilt, or zoom a vital sign acquisition camera 276 so that it is focused on a patient's face and/or torso. Additionally or alternatively, face/torso acquisition module 264 may pan, tilt, or zoom one vital sign acquisition camera 276 to capture the patient's face, another to capture the patient's torso, another to capture the patient's entire body, etc. Various vital signs and/or physiological parameters may then be acquired. For instance, vital signs such as the patient's pulse, $SpO_2$, respiratory rate, and blood pressure may be obtained, e.g., by vital signs measurement module 266, by performing image processing on an image/video of the patient's face captured by vital sign acquisition camera(s) 276. Vital signs and/or physiological parameters such as the patient's respiratory rate, general posture (which may indicate pain and/or injury), and so forth may be obtained, e.g., by vital signs measurement module 266, by performing image processing on an image/video of the patient's torso captured by vital sign acquisition camera(s) 276. Of course, the face and torso are just two examples of body portions that may be examined to obtain vital signs, and are not meant to be limiting.

Deterioration detection module 268 may be configured to analyze one or more signals to determine whether a condition of a registered patient is deteriorating, improving, and/or remaining stable. In some embodiments, the patient condition may be represented, at least in part, by the same patient acuity measures described above for determining order of patients for monitoring. As such, the deterioration detection module 268 may include one or more CDS, case-based reasoning, or other clinical reasoning algorithms as described herein or other clinical reasoning algorithms (e.g., trained logistic regression models or other machine learning models) for assessing patient condition measures other than acuity measures described herein. In some embodiments, the algorithms for assessing patient acuity or other measures of patient condition employed by the deterioration detection module 268 may be updated from time to time by, for example, writing new trained weights (e.g., theta values) for a selected machine learning module or providing new instructions for execution by a processor (e.g. in the form of a java archive, JAR, file or compiled library). These signals may include, for instance, a patient's initial vital signs and other physiological information (e.g., obtained at blocks 108-110 of FIG. 1), updated vital signs obtained by vital signs measurement module 266, a patients initial patient acuity measure (e.g., calculated during registration), and/or a patient's updated patient acuity measure (e.g., calculated based on updated vital signs and/or physiological parameters received from vital signs measurement module 266). Based on determinations made using these signals, deterioration detection module 268 may send various alerts to various other modules to take various actions. For example, deterioration detection module 268 may publish an alert, e.g., by sending the alert to EPS module 270 so that EPS module can publish the alert to subscribed modules, such as alarm module 248 of hospital information system 240. In some embodiments, such an alert may include, for instance, a patient's name (or more generally, a patient identifier), a picture, the patient's last detected location in the waiting room, baseline vital signs, one or more updated vital signs, and/or an indication of a patient acuity measure. On receipt of the alert, alarm module 248 may raise an alert or alarm to medical personnel of the patient's deterioration and, among other things, the patient's last detected location in the waiting room.

EPS module 270 may be a general communication hub that is configured to distribute events released by various other components of FIG. 2. In some embodiments, all or at least some of the other modules depicted in FIG. 2 may generate events that indicate some form of result/determination/computation/decision from that module. These events may be sent, or "published," to EPS module 270. All or some of the other modules depicted in FIG. 2 may elect to receive, or "subscribe to," any event from any other module. When EPS module 270 receives an event, it may sent data indicative of the event (e.g., forward the event) to all modules that have subscribed to that event.

In some embodiments, EPS module 270 may be in communication with one or more databases, such as database 272 and/or archive 274 (which may be optional). In some embodiments, EPS module 270 may accept remote procedure calls ("RPC") from any module to provide access to information stored in one or more databases 272 and/or 274, and/or to add information (e.g., alerts) received from other modules to databases 272 and/or 274. Database 272 may store information contained in alerts, publications, or other communications sent/broadcast/transmitted by one or more other modules in FIG. 2. In some embodiments, database 272 may store, for instance, reference images associated with patients and/or their initial vital signs, updated vital signs (acquired by vital sign acquisition camera 276), and/or patient acuity measures. Optional archive 274 may in some embodiments store the same or similar information for a longer period of time.

It will be apparent that various hardware arrangements may be utilized to implement the patient monitoring system 252. For example, in some embodiments, a single device may implement the entire system 252 (e.g., a single server to operate the camera 276 to perform the vital signs acquisition functions 260-266 and to perform the vital sign(s) analysis and alerting functions including deterioration detection 268 and patient queue management 258). In other embodiments, multiple independent devices may form the system 252. For example, a first device may drive the vital sign acquisition camera 276 and implement functions 260-266 while another device(s) may perform the remaining functions. In some such embodiments, one device may be local to the waiting room while another may be remote (e.g., implemented as a virtual machine in a geographically distant cloud computing architecture). In some embodiments, a device (e.g., including a processor and memory) may be disposed within the vital sign acquisition camera 276 itself and, as such, the camera 276 may not simply be a dumb peripheral and, instead may perform the vital signs functions 260-266. In some such embodiments, another server may provide indications (e.g. identifiers, full records, or registered facial images) to the camera 276 to request that vitals be returned for further processing. In some such embodiments, additional functionality may be provided on-board the camera 276 such as, for example, the deterioration detection 268 (or preprocessing therefor) and/or patient queue module 258 management may be performed on-board the camera 276. In some embodiments, the camera 276 may even implement the HIS interface 250 or EPS 270. Various additional arrangements will be apparent.

Figure 3:
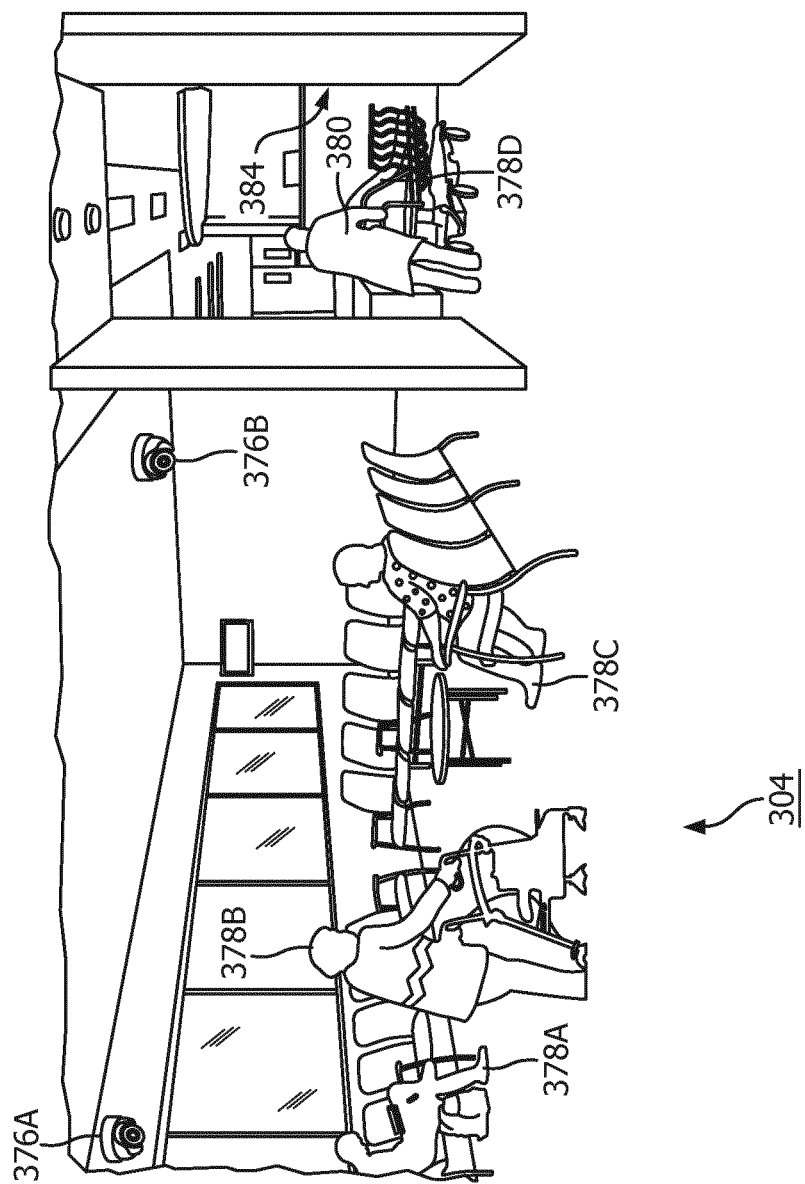
FIG. 3 depicts an example scenario in which disclosed techniques may be practiced, in accordance with various embodiments.

FIG. 3 illustrates an example scenario in which disclosed techniques may be implemented to identify patients 378A-C in a waiting room 304 for monitoring purposes. In this example, three patients 378A-C are waiting in a hospital waiting room 304 to be attended to by medical personnel 380. Two video cameras 376A, 376B are mounted on a surface (e.g., ceiling, wall) of waiting room 304. The two video cameras 376A, 376B may be used to monitor patients 378 in waiting room 304. The patients 378A-C may each be assigned a patient acuity measure by triaging medical personnel (not depicted) based on a preliminary patient condition analysis. As the patients 378 wait for an attending physician, the two video cameras 376A, 376B may capture digital image(s) that are analyzed using techniques described herein to identify patients selected for monitoring. The same video cameras (assuming they are configured to unobtrusively acquire vital signs) or different video cameras may then be operated to monitor patients 378 as described above, e.g., to detect patient deterioration. In some embodiments, a patient acuity measure associated with a patient may be updated by medical personnel in response to detection by patient monitoring system (more specifically, deterioration detection module 268) that a patient has deteriorated. In various embodiments, when a new patient enters waiting room 304, a new round of patient monitoring and prioritization may be performed, e.g., by patient monitoring system 252. The patient queue may be automatically updated, e.g., by patient queue module 258, each time a new patient enters waiting room 304. Additionally or alternatively, medical personnel may manually update the patient queue to include a newly-arrived patient after triaging.

Techniques described herein are not limited to hospital waiting rooms. There are numerous other scenarios in which techniques described herein may be implemented to identify subjects in digital images or videos. For example, disclosed techniques may also be used for security monitoring of crowds in airports, arenas, border crossings, and other public places. In such scenarios, rather than monitoring patients to determine patient acuity measures, subjects may be identified for other purposes, such as risk assessments or post-event investigation. Techniques described herein may also be applicable in scenarios such as in fitness environments (e.g., gyms, nursing homes) or other surveillance scenarios (e.g., airports, border crossings, etc.) in which identification of individual subjects depicted in digital images may be implemented. For example, in airports, subjects waiting at gates could be identified, for example, by comparing their respective features with features obtained at checkin. In addition, techniques described herein may be used to identify patients who left without being seen, without requiring that patients' faces be visible.

Figure 4:
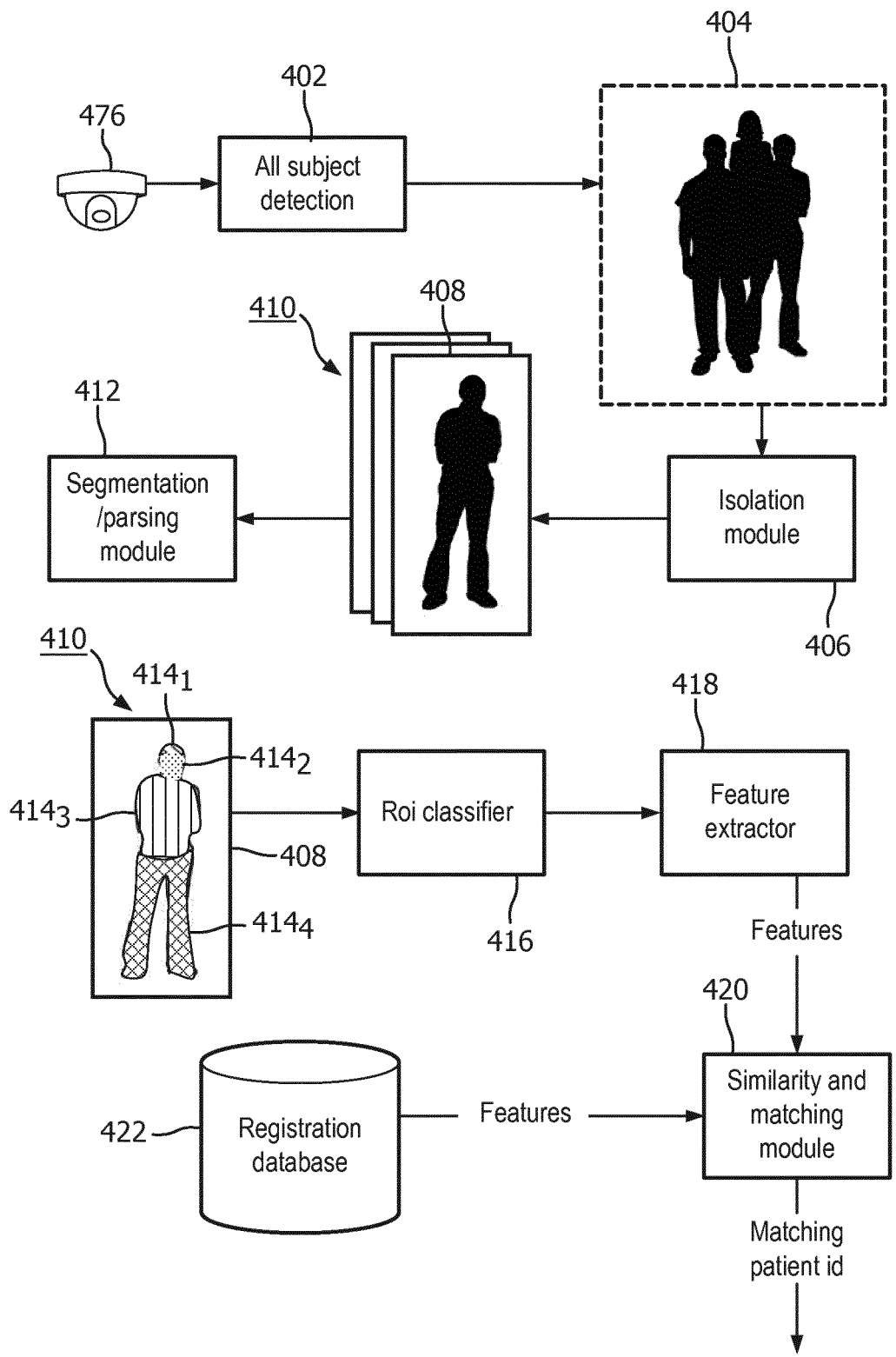
FIG. 4 depicts example components that may be implemented as part of a patient identification module, in accordance with various embodiments.

FIG. 4 schematically depicts an example of components configured with selected aspects of the present disclosure, as well as example interactions between those components. In various embodiments, one or more of these components may be implemented using any combination of hardware and software, e.g., as part of patient identification module 260 in FIG. 2. Starting at top left, a camera may be configured to capture one or more digital images (e.g., individual images and/or a stream of images). In FIG. 4, the camera takes the form of a vital sign acquisition camera 476 that was described previously. However, this is not meant to be limiting. Techniques described herein may be implemented using a variety of different types of cameras in a variety of different contexts. For example, closed circuit television ("CCTV") and other types of cameras may capture digital images that could be analyzed using disclosed techniques.

An all subject (person) detection module 402 (alternatively, background removal module) may be configured to analyze the images captured by camera 476 and, assuming multiple subjects are depicted in the image(s), generate a mask or region of interest 404 that corresponds to subjects depicted in the digital image(s). In some embodiments, a neural network (e.g., a convolutional neural network) may be trained to perform this analysis. For example, the neural network may be trained using training examples in the form of pixel-wise labeled digital images depicting multiple subjects. Each pixel may be labeled as being, or not being, part of a depicted subject. These training examples may be applied as input across the neural network to generate output that includes a pixel-wise "guess" as to which pixels are or are not part of a depicted subject. This output may be compared (e.g., using a loss function) to the pixel-wise labeled training examples to determine a difference (or error). The neural network may then be trained to minimize this difference (or error) using various techniques, including optimization techniques such as stochastic gradient descent and back propagation. Of course, other techniques may be employed in addition to or instead of machine learning to isolate subjects within the digital image.

Figure 5:
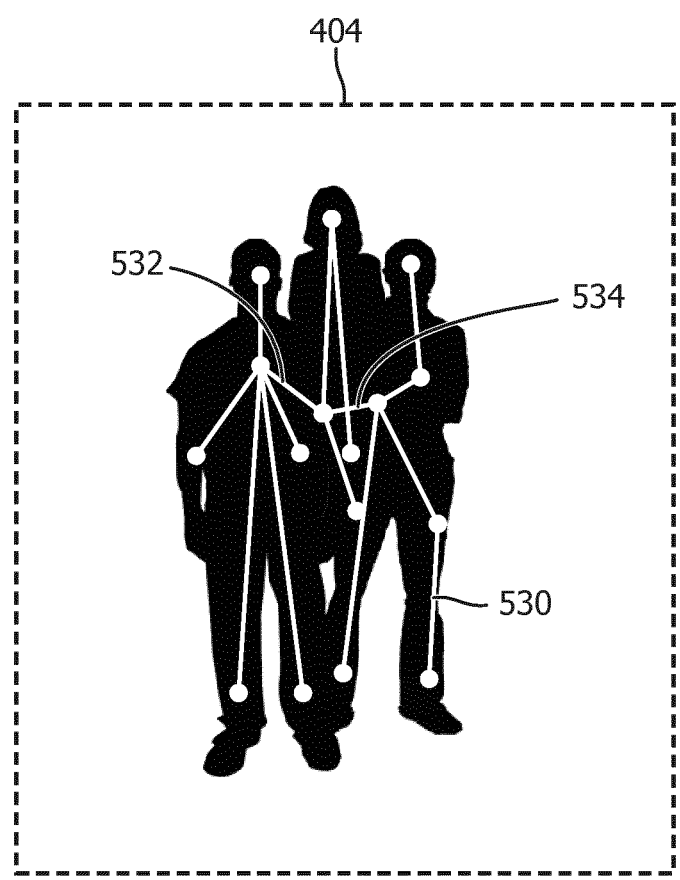
FIG. 5 depicts an example of how skeletonization, watershed, or keypoints can be used for instance segmentation to identify distinct subjects depicted in a digital image.

Isolation module 406 may be configured to analyze the subject mask 404 to segment the digital image(s) into a plurality of portions 408 that each depicts a different subject 410 of the multiple subjects. In some embodiments, the plurality of subjects contained in the digital image may be "skeletonized" into a mask for instance segmentation. FIG. 5 depicts one example of how the subjects of FIG. 4 might be skeletonized into a mask 530. In this example, limb, joint, and posture elements associated with the three subjects captured in the subject mask 404 are used to generate a topological skeleton mask 530. To distinguish the subjects from each other—i.e. to separate mask 530 into three discreet sub mask s, one for each subject—in some embodiments, one or more so-called "minimum cuts" (or a variation thereof) may be applied. For example, in FIG. 5, the edges 532 and 534 have the lowest slope of all the edges in mask 530. Accordingly, these edges may be removed to separate mask 530 into three distinct mask, one for each subject. Once each subject is represented by a distinct sub mask, portions of the original digital image depicting each subject can be identified and separately analyzed.

Other techniques may be applied by isolation module 406 instead of skeletonization in order to distinguish between individual subjects. In some embodiments, the digital image may be segmented into a plurality of portions, each depicting an individual subject, using pose estimation (e.g., iteratively comparing the two-dimensional digital data to a plurality of known human poses). In some embodiments, pose estimation may be implemented instead of or in addition to skeletonization and minimum cut. In yet other embodiments, other techniques may be employed to segment the digital image into portions depicting individual subjects, such as parsing on edges (e.g., using Canny edge detection).

Referring back to FIG. 4, in some embodiments, the operations described above as being performed by components 402 and 406 may instead be performed using an end-to-end deep (e.g., convolutional) neural network, e.g., using the watershed algorithm described in M. Bai and R. Urtasun, "Deep watershed transform for instance segmentation." 24 Nov. 2016. In this paper, a discretized energy value is predicted for each pixel. The watershed algorithm may then be used to segment the energy surface into instances of separate objects (in the present disclosure, distinct subjects).

However the digital image(s) is segmented into portions 408 depicting individual subjects 410, segmentation/parsing module 412 may be configured to segment each portion 408 of the digital image depicting a particular subject 410 into a plurality of superpixels $414_{1-4}$. The final superpixels may correspond with visual features of the subject. For example, one superpixel may contain the subject's hair, another may contain the subject's face/head (if visible in the digital image), another may contain the subject's torso clothing (e.g., shirt, sweater, jacket, etc.), and yet another superpixel may contain the subjects pants (or shorts, or dress, etc.). In various embodiments, superpixels that contain other visual elements of the subject, such as accessories (e.g., purses, hats, gloves), shoes, stockings, socks, etc., may also be generated. In some embodiments, a first set of superpixels may be generated, with each superpixel containing pixels that satisfy one or more similarity constraints. Because clothing tends to have irregular visual features (e.g., folds, creases, etc.), and because real life scenes captured may have various obstructions (e.g., subjects looking at their phones, partially blocked, etc.), the initial set of superpixels may not necessarily correspond very precisely with the subject's actual clothing.

Accordingly, in various embodiments, the initial set of superpixels may be clustered (e.g., using simple linear iterative clustering, or "SLIC") with other superpixels that share various semantic attributes. Additionally or alternatively, other approaches may be employed such as Conditional Random Fields ("CRF") or deep learning based segmentation approaches such as deep decompositional neural networks ("DDN") or fully convolutional neural networks ("FCN"). In some embodiments, for each over-segmented (e.g., too small) superpixel, the k (integer greater than zero) nearest neighbors may be identified based on descriptive features. These features may include, but are not limited to, color, texture, patterns (e.g., polka dot, plaid, etc.) spatial location, morphology, etc. In some embodiments, a convolutional neural network could be trained to identify semantically similar superpixels. Superpixels may be compared pairwise in some embodiments, but in other embodiments, superpixels may be grouped in larger multiples. For instance, if a first superpixel is similar to both a second superpixel and a third superpixel (e.g., pursuant to some predetermined threshold) and the second and third superpixels have components that are connected to the first superpixel, then all three superpixels may be clustered into a single superpixel.

Next, a region of interest ("ROI") classifier 416 may be configured to assign a semantic label to each superpixel generated by segmentation/parsing module 412. Intuitively, ROI classifier 416 determines which portion of a subject corresponds to each superpixel. For example, a first superpixel may correspond to clothing worn over the subject's legs (e.g., pants, shorts, a skirt, etc.), another superpixel may correspond to the subject's torso, another may correspond to the subject's hair, another may correspond to the subject's face, and so on.

ROI classifier 416 may employ various techniques to assign semantic labels to superpixels. In some embodiments, ROI classifier 416 may identify bounding boxes or other spatial regions for various portions of the subject, and superpixels contained within those bounding boxes may be assigned corresponding semantic labels. For example, a bounding box may be identified for the entire subject (which would include all the superpixels associated with that subject). Then, the largest superpixel with at least half of its area above (in a standard Cartesian plane) a particular threshold (e.g., at approximately neck height) may be assigned the semantic label of "head." The second largest superpixel with the majority of its area above that threshold may be assigned the semantic label of "hair." A semantic label of "pants" may be assigned to the largest superpixel with at least half its area below another threshold (e.g., an approximately of a waistline). A semantic label of "torso" "top," or "shirt" may be assigned to the largest superpixel with the majority of its area between the two thresholds. Of course, this is not meant to be limiting, and other thresholds and/or metrics may be employed in other scenarios, e.g., when a subject wears a full length dress or medical gown. And similar to above, other techniques may be employed as well, e.g., by ROI classifier 416, to assign semantic labels to superpixels, such as pose estimation and/or probability maps.

Feature extractor 418 may be configured to various extract features of each semantically labeled superpixel for downstream processing. These features may take various forms, such as colors, textures, patterns (e.g., plaid, polka dot, striped, etc.), reflectivity, size, and so forth. In some embodiments, different features may be extracted based on the semantic label assigned to the superpixel. For example, for a superpixel assigned a semantic label of "torso," features such as sleeve type (e.g., sleeveless, short sleeved, long sleeved), neck line, and so forth may be extracted. For a superpixel assigned a semantic label of "hair," features such as color, curl type, texture, sheen, coverage, shape (e.g., ponytail), etc. may be extracted.

Similarity and matching module 420 may be configured to determine whether a particular subject depicted in the original digital image(s) captured by camera 476 matches a subject depicted in a reference image stored in a registration database 422. As noted above, in some contexts, reference images of subjects may be captured, e.g., by patient capture module 254 in FIG. 2 during patient registration. In some embodiments, the reference images may be preprocessed by the same components depicted in FIG. 4, such that registration database 422 not only stores the reference images of registered subjects, but also features extracted from semantically-labeled "reference" superpixels identified in those reference images. In various embodiments, matching a particular subject depicted in a digital image captured by camera 476 to a reference image stored in a registration database 422 may include calculating a measure of similarity between their various extracted features. In various implementations, similarity may be computed using a variety of techniques and/or concepts, including but not limited to Euclidian distance, cosine similarity, and so forth.

In some embodiments, similarity and matching module 420 may be configured to determine a measure of similarity between the features extracted, e.g., by feature extractor 418, from each semantically-labeled superpixel and features extracted from a reference superpixel identified in a reference digital image. In some embodiments, the reference superpixel used for comparison may have a "reference" semantic label that matches the semantic label assigned to the superpixel under consideration. Intuitively, torso superpixels may be compared to reference torso superpixels, hair superpixels may be compared to reference hair superpixels, and so on. Based on measures of similarity determined for a plurality of superpixels under consideration (i.e. associated with a particular portion of the digital image depicting the subject under consideration), similarity and matching module 420 may determine that the subject under consideration is, or is not, depicted in the reference image.

Figure 6A:
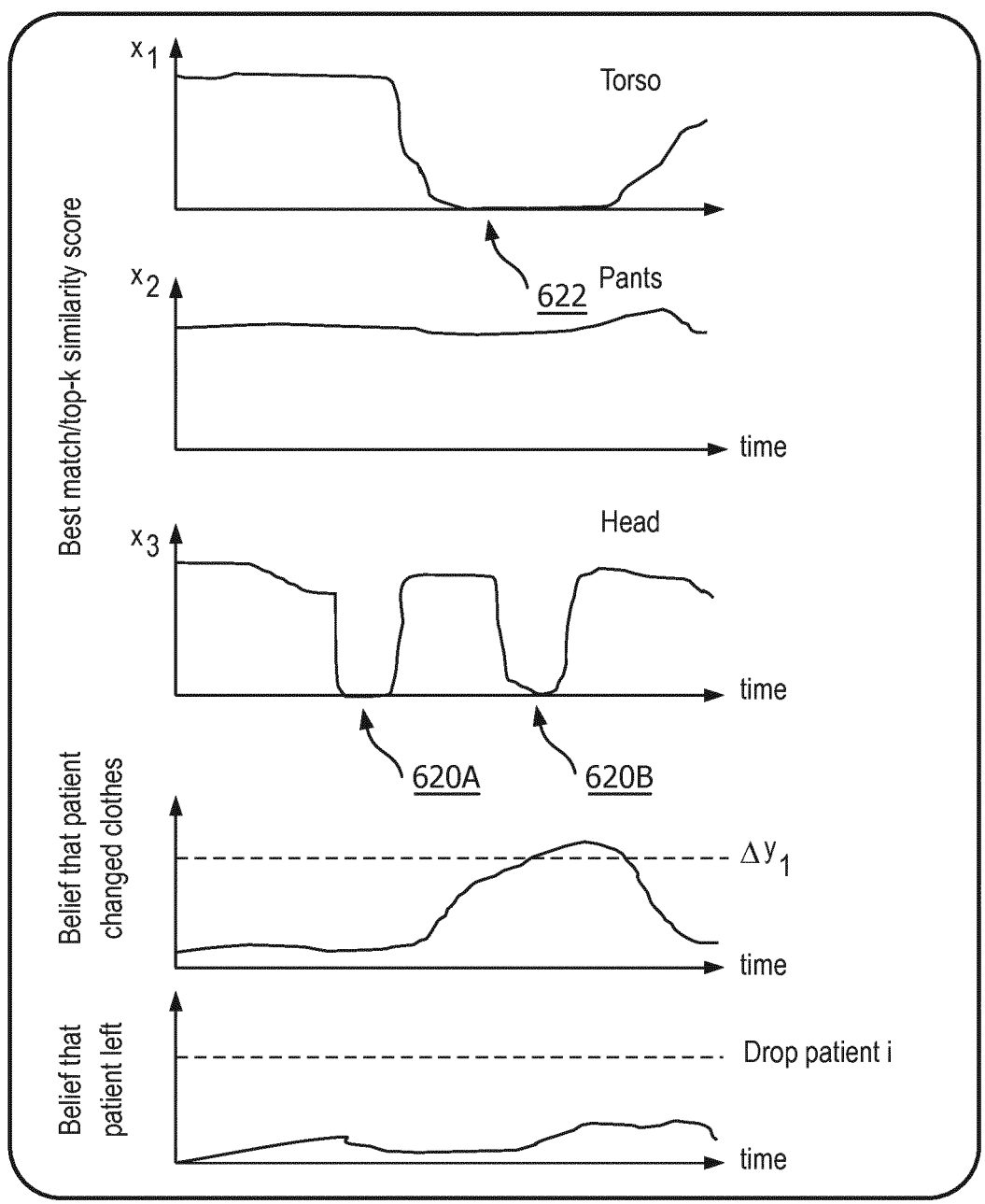
FIGS. 6A and 6B depict example plots of data that demonstrate various aspects of the present disclosure.

FIG. 6A demonstrates one example of how, over time, similarity and matching module 420 may match a subject depicted in a series of digital images (e.g., a video stream) under consideration with a subject depicted in a reference digital image, regardless of whether, during capture of the series of digital images, the subject's face is not always visible, the subject removes a shirt or sweater, etc. The top three plots, $x_1$, $x_2$, and $x_3$, represent similarity scores of superpixels semantically labeled as "torso," "pants," and "head," respectively, as a function of time. More particularly, each plot represents an ongoing similarity score between a respective superpixel detected in the series of digital images and a corresponding (i.e., same semantic label) static superpixel from a reference digital image.

Thus, for instance, in the plot $x_3$ representing the subject's head, it can be seen that during time intervals 620A and 620B, the subject's face was not visible to the camera, e.g., because the subject was looking away, or the subject's face was temporarily obstructed (e.g., with a mobile phone). Additionally, in the plot $x_1$ during time interval 622, the torso similarity drops. This may be because, for instance, the patient removed or donned a sweater or jacket.

The bottom two plots in FIG. 6A represent ongoing beliefs (determined based on $x_1$, $x_2$, and $x_3$) that the subject ("patient" in FIG. 6A) has changed clothes and left the vicinity (e.g., the waiting room), as functions of time. In various embodiments, the ongoing belief that the patient changed clothes may be determined based on multiple similarity scores. For example, if a similarity score calculated between pants/head superpixels remains constant but the similarity score between torsos changes dramatically/suddenly, that may indicate that the patient has changed his or her torso clothing. This can be seen in FIG. 6A during time interval 622. The belief that the patient changed clothes remains low until time interval 622, at which point the belief of a superpixel change event increases in response to the temporally-corresponding sudden and dramatic decrease in the similarity score $x_1$ only (e.g., the subjected donned or removed a sweater or jacket). At the same time, the belief that the subject ("patient" in FIG. 6A) left in the bottom plot does not increase appreciably. This may be because other superpixels corresponding to the subject still match reference superpixels of the subject's reference digital image. For example, the similarity score $x_2$ remains relatively constant during time interval 622, suggesting the subject is still wearing the same pants.

Figure 6B:
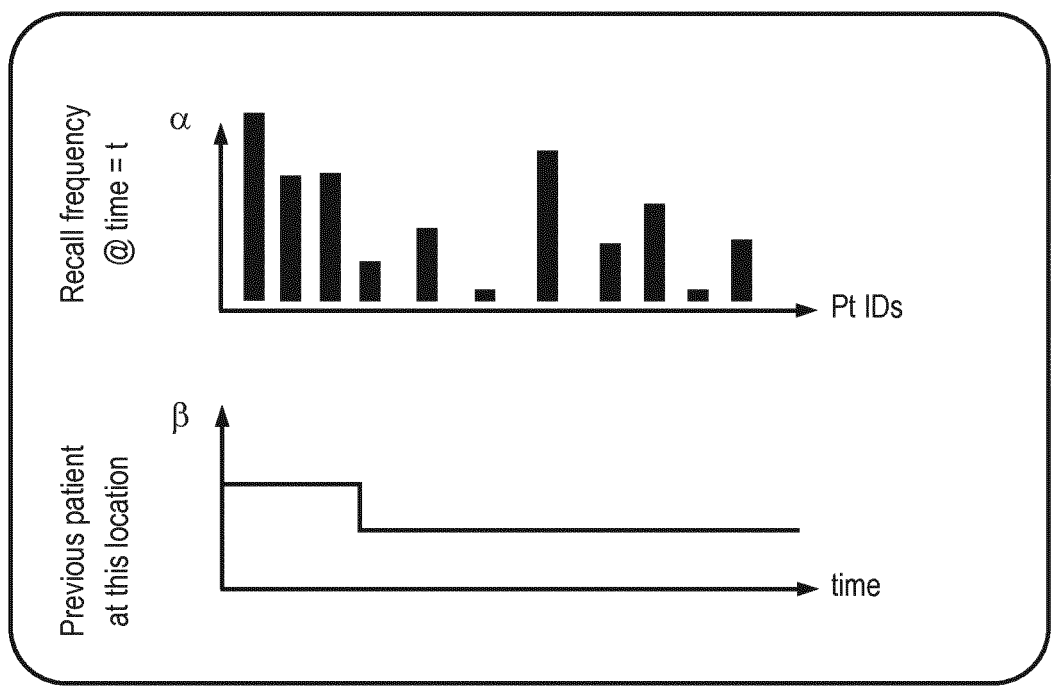

FIG. 6B depicts more plots associated with the scenario represented by the plots in FIG. 6A. In FIG. 6B, the horizontal axis in the top plot represents respective subject identifiers ("Pt IDs"). There are eleven bars depicted in the top plot of FIG. 6B, which means there may be eleven subjects in the area (e.g., waiting room 104) being monitored. The vertical axis of the top plot of FIG. 6B represents α recall frequency a for each subject after a particular time t, i.e. how many times each subject was matched to a reference digital image using techniques described herein. It can be seen that (starting from the left) the first, second, third, and seventh patients were matched far more frequently than the other subjects. This may often be the case when particular subjects are relatively homogenous in appearance. For example, multiple subjects having similar body types (e.g., height, mass) may also be wearing similar clothes (dark pants and light shirts are common), such as matching uniforms. Frequent identification of particular subjects may result in misidentification or failure to identify some subjects, and over-identification of others. The bottom plot in FIG. 6B represents detection β of a previous patient at a particular location (e.g., waiting room seat) as a function of time.

In various embodiments, various so-called "penalties" may be applied when a particular reference digital image is too-frequently matched to multiple subjects, or when there is excessive change of a predicted patient's location. For example, suppose a new subject's superpixels (e.g., corresponding to head, torso, legs) are represented by $[x_1, x_2, x_3]$. Suppose reference superpixels having the same semantic labels that were generated from one or more reference digital images are represented by $[y_1, y_2, y_3]$. In various implementations, the reference superpixels $[y_1, y_2, y_3]$ may be used to determine a weight $c_j$ to assign to each reference superpixel $y_j$, e.g., by providing the reference image to a trained machine learning model (e.g., trained using labeled reference images with clothing/hair having known characteristics). In some implementations, the following equation may be applied:

$$\min_i \sum_{j=1}^{n} c_j \|x_j - y_j^{(i)}\|^2 + \lambda f(\alpha_i, \beta_i)$$

i and n are positive integers that represent, respectively, the subject being searched for and the number of superpixels under consideration (e.g., if head, torso, and pants superpixels are being used, then n=3). λ may be a regularization parameter that represents the penalty. The purpose of this equation, intuitively speaking, is to "level" out the top plot shown in FIG. 6B, e.g., to make all the bars have relatively uniform heights (i.e., the patients are identified at relatively equal frequencies). Alternatively, in some embodiments, deep learning based approaches such as Long Short Term Memory ("LSTM") Recurrent Neural Network ("RNN") could be used to learn these temporal signatures.

Figure 7:
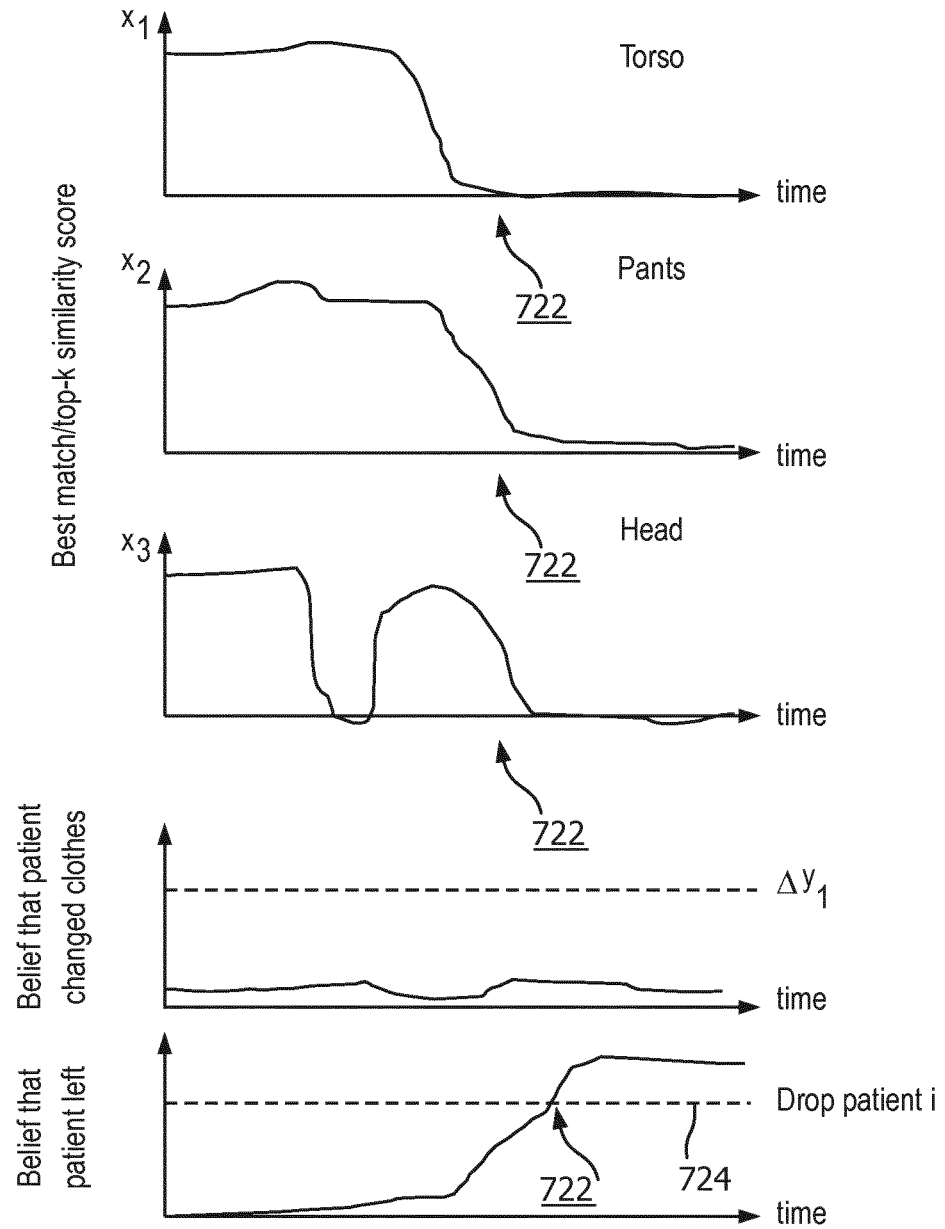
FIG. 7 depicts additional example plots of data that demonstrate various aspects of the present disclosure.

FIG. 7 demonstrates plots similar to those depicted in FIG. 6A. However, in this example, the subject ("patient" in FIG. 7) actually left the area (e.g., waiting room 104). Accordingly, the similarity scores $x_1$, $x_2$, and $x_3$ all decrease dramatically near the point in time designated at 722. Because all three similarity scores experience coinciding decreases, the conclusion may be that the subject has left. This is reflected in the second-from-bottom and bottom plots. The belief that the patient changed clothes remains low, and at point in time 722, the belief that the subject (patient) left increases above a "drop patient" threshold 724. Such a drop patient threshold may be selected manually, or may be selected automatically, e.g., based on empirical evidence, by training a machine learning model, etc. Under such circumstances, patient identification module 260 may determine that the subject left the area (e.g., patient left without being seen).

Figure 8:
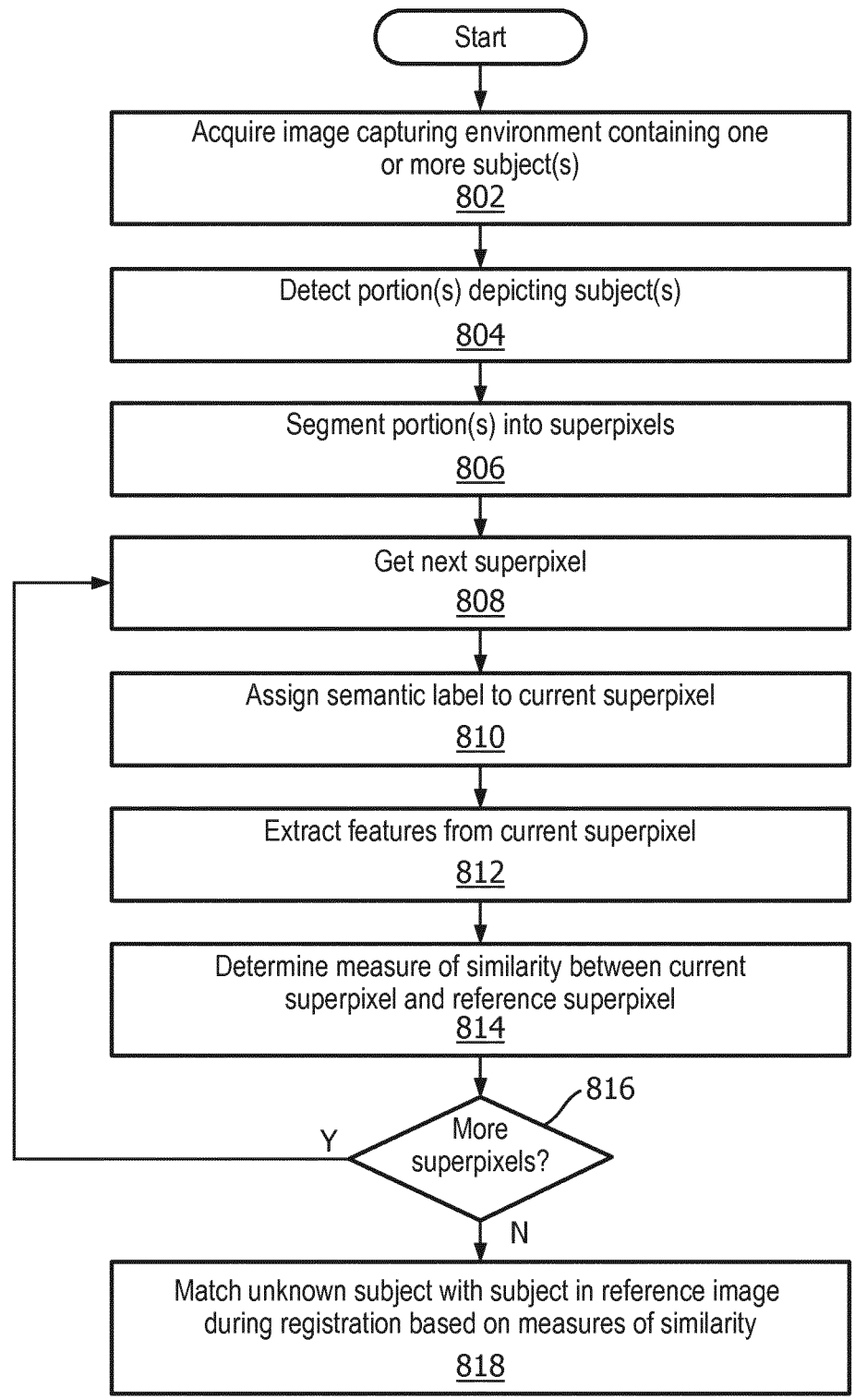
FIG. 8 depicts an example method of identifying people in digital images, in accordance with various embodiments.

FIG. 8 schematically depicts, at a relatively high level, one example method 800 for identifying subjects that may be employed, for instance, by patient identification module 260. In circumstances unrelated to patient monitoring, the component performing method 800 may be entirely different than patient identification module 260. While operations of method 800 are depicted in a particular order, this is not meant to be limiting. In various embodiments, one or more operations may be added, omitted, or reordered.

At block 802, patient identification module 260 may acquire, e.g., via vital sign acquisition camera (276, 476) or another camera, one or more digital images (e.g., from a video stream) that captures a scene (e.g., a waiting room) that contains one or more subjects(s). At block 804, patient identification module 260 may detect one or more portion(s) depicting subject(s) in the digital image. In some embodiments, patient identification module 260 may, e.g., by way of all subject detection module 402 and/or isolation module 406, detect the one or more portion(s) depicting subjects(s) using a variety of techniques, some of which were described above with regard to components 402 and 406, e.g., to isolate the subjects from each other and/or the background (e.g., by building a mask).

At block 806, patient identification module 260 may, e.g., by way of segmentation/parsing module 412, perform so-called "superpixel parsing" to segment a particular portion of the digital image depicting a subject into a plurality of superpixels. A "superpixel" may be an image patch that is more precisely aligned with edges than a rectangular patch. As noted above, segmentation module 414 may generate an initial set of superpixels, and then may cluster similar superpixels in order to coalesce superpixels that represent the same semantic region of the depiction of the subject (e.g., shirt, pants, etc.).

At block 808, patient identification module 260 may get the next superpixel (or if this is the first superpixel being analyzed, may get the first superpixel) and make it the "current" superpixel. At block 810, patient identification module 260, e.g., by way of ROI classifier 416, may assign a semantic label to the current superpixel. Techniques for assigning semantic labels were described above. For instance, the superpixel with the majority of its area above a neck line threshold may be deemed the head. The superpixel with the majority of its area below a waistline threshold may be deemed the legs/pants. And so forth.

At block 812, patient identification module 260, e.g., by way of feature extractor 418, may extract various features from the current superpixel. The type of features extracted may depend on the semantic label assigned to the current superpixel. For example, color and texture may be extracted from a hair superpixel, whereas shape may or may not be extracted because hair is by nature often dynamic and may change between images. Color, textures, shapes, and patterns (e.g., plaid) may be some of the features extracted from torso and/or legs superpixels. In some embodiments, for each superpixel, patient identification module 260 may extract features such as hue-saturation-value ("HSV") color, two-dimensional color histograms (e.g. LAB color space), superpixel geometric ratios, superpixel feature similarities, edges, textures, and/or contours. In some embodiments, contours and other similar features may be extracted using algorithms such as histogram of oriented gradients ("HOG"), speeded up robust features ("SURF"), optical flow, etc. Moreover, convolutional neural networks ("CNN") may extract higher level features. One or more of these algorithms are available as part of the Open Source Computer Vision ("OpenCV") library.

At block 814, patient identification module 260, e.g., by way of similarity and matching module 420, may determine a measure of similarity (e.g., $x_1$, $x_2$, $x_3$ in prior figures) between features extracted from the current superpixel and reference features extracted from one or more corresponding (e.g., having the same semantic label) reference superpixels of a reference digital image. Various techniques may be employed to determine the measure of similarity, such as dot products, cosine similarities, etc. At block 816, if there are additional superpixels yet-to-be analyzed, then the next superpixel may be selected and made the "current" superpixel. Method 800 may then proceed back to block 808 and the next superpixel may be analyzed. If the answer at block 816 is no, on the other hand, then method 800 may proceed to block 818.

At block 818, patient identification module 260, e.g., by way of similarity and matching module 420, may match the subject depicted in the portion of the digital image under analysis to a subject depicted in a reference image (e.g., captured during registration in the patient monitoring context) based on the similarity scores. For example, suppose that for a particular subject, similarity scores for hair/head and pants superpixels are highest in relation to a particular reference image. Even if the torso similarity measure is lower, the subject may still be matched to the reference image because, as was demonstrated in FIG. 6A, the subject may have simply donned or removed a jacket or sweater.

In some embodiments, individuals' privacy may be respected and/or protected in various ways. For example, rather than storing complete reference digital images of registered patients, in some embodiments, only those features/activations/output generated by application of the reference digital images to a machine learning model may be retained in memory for later comparison. The full digital images may be discarded (automatically or by request). Similarly, digital images capturing a scene in which the persons to be identified are contained may also be discarded after features/activations/outputs generated by application of the digital images are generated. Thus, when attempting to identify a person, only the features associated with the respective digital images may be retained and compared. This may alleviate concerns of some people that their images not be retained.

Figure 9:
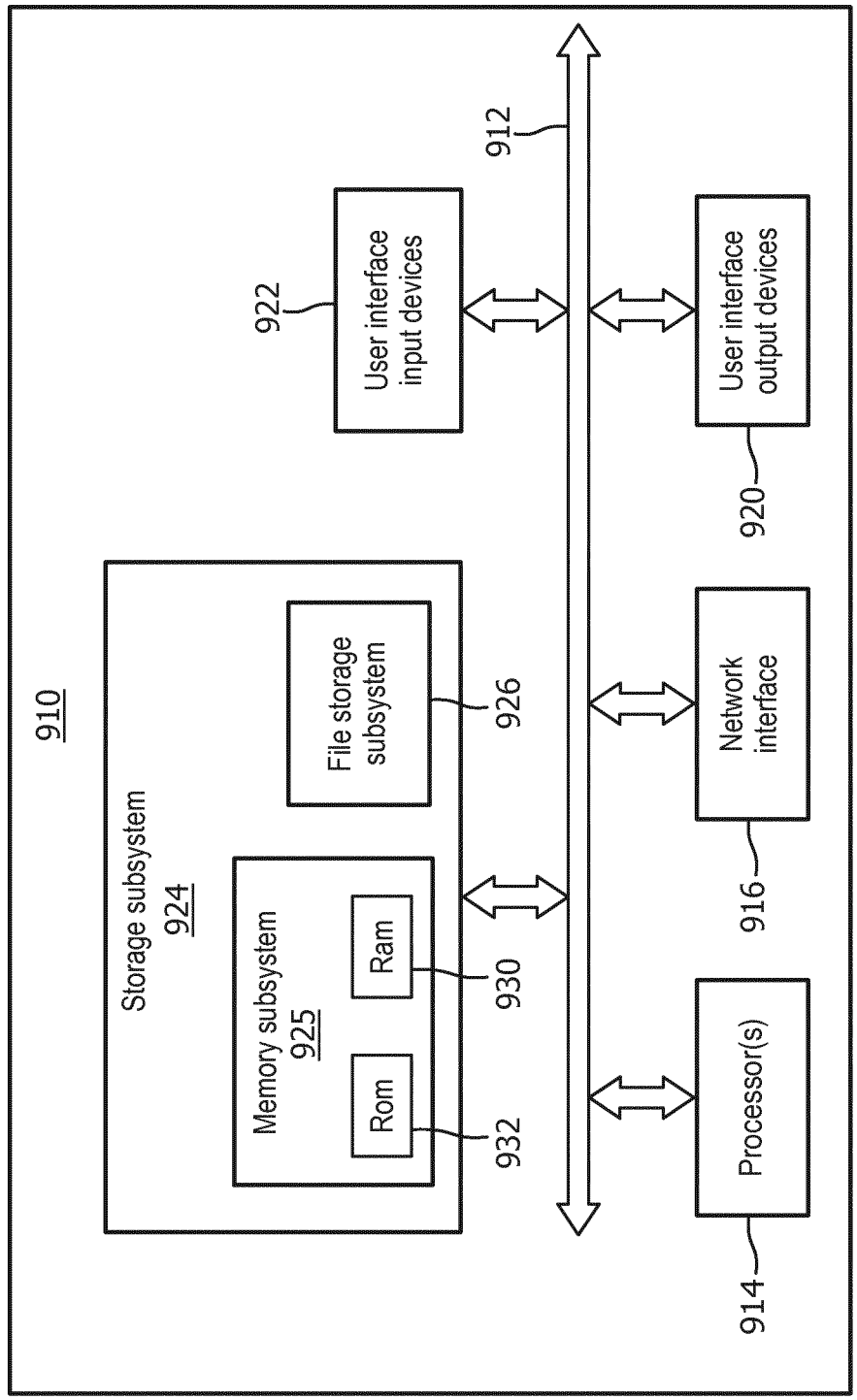
FIG. 9 depicts components of an example computer system.

FIG. 9 is a block diagram of an example computer system 910. Computer system 910 typically includes at least one processor 914 which communicates with a number of peripheral devices via bus subsystem 912. As used herein, the term "processor" will be understood to encompass various devices capable of performing the various functionalities attributed to components described herein such as, for example, microprocessors, FPGAs, graphical processing units ("GPUs"), ASICs, other similar devices, and combinations thereof. These peripheral devices may include a data retention subsystem 924, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Data retention system 924 stores programming and data constructs that provide the functionality of some or all of the modules described herein. For example, the data retention system 924 may include the logic to perform selected aspects of method 800, and/or to implement one or more components of patient monitoring system 252, including patient identification module 260.

These software modules are generally executed by processor 914 alone or in combination with other processors. Memory 925 used in the storage subsystem can include a number of memories including a main random access memory (RAM) 930 for storage of instructions and data during program execution, a read only memory (ROM) 932 in which fixed instructions are stored, and other types of memories such as instruction/data caches (which may additionally or alternatively be integral with at least one processor 914). A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the data retention system 924, or in other machines accessible by the processor(s) 914. As used herein, the term "non-transitory computer-readable medium" will be understood to encompass both volatile memory (e.g. DRAM and SRAM) and non-volatile memory (e.g. flash memory, magnetic storage, and optical storage) but to exclude transitory signals.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. In some embodiments, computer system 910 may be implemented within a cloud computing environment. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A computer-implemented method, comprising:
    acquiring, by one or more processors, a digital image that captures an environment containing at least a first subject;
    segmenting, by one or more of the processors, a first portion of the digital image depicting the first subject into a plurality of superpixels;
    for each superpixel of the plurality of superpixels:
        assigning, by one or more of the processors, a semantic label to the superpixel,
        extracting, by one or more of the processors, features of the superpixel, and
        determining, by one or more of the processors, a measure of similarity between the features extracted from the superpixel and features extracted from a reference superpixel identified in a reference digital image, wherein the reference superpixel has a reference semantic label that matches the semantic label assigned to the superpixel; and
    determining, by one or more of the processors, based on the measures of similarity associated with the plurality of superpixels, that the first subject is depicted in the reference image.

2. The computer-implemented method of claim 1, wherein the digital image captures a scene containing a plurality of subjects that includes the first subject, and the method further comprises segmenting the digital image into a plurality of portions that each depicts a different subject of the plurality of subjects.

3. The computer-implemented method of claim 2, wherein the digital image is segmented into the plurality of portions by instance segmenting the plurality of subjects contained in the digital image into a mask.

4. The computer-implemented method of claim 3, wherein cuts of the mask are used to separate the mask into discrete sub-masks, wherein each sub-mask corresponds to an individual subject of the plurality of subjects.

5. The computer-implemented method of claim 2, wherein the digital image is segmented into the plurality of portions using pose estimation.

6. The computer-implemented method of claim 1, wherein at least one of the plurality of superpixels is assigned a semantic label that is associated with clothing worn over human torsos.

7. The computer-implemented method of claim 6, further comprising determining, by one or more of the processors, based on one or more of the measures of similarity associated with the plurality of superpixels, a likelihood that the first subject altered clothing worn over a torso of the first subject during a time interval between when the reference digital image was captured and when the digital image was captured.

8. The computer-implemented method of claim 1, wherein at least one of the plurality of superpixels is assigned a semantic label that is associated with clothing worn over human legs.

9. The computer-implemented method of claim 1, wherein at least one of the plurality of superpixels is assigned a semantic label that is associated with human hair.

10. The computer-implemented method of claim 1, wherein at least one of the plurality of superpixels is assigned a semantic label that is associated with human faces.

11. The computer-implemented method of claim 6, further comprising determining, by one or more of the processors, based on the measures of similarity associated with the plurality of superpixels:
a first likelihood that an appearance of the first subject was altered during a time interval between when the reference digital image was captured and when the digital image was captured, and a second likelihood that the first subject left the environment.

12. The computer-implemented method of claim 1, wherein the environment comprises a hospital waiting room, a gym, or an airport.

13. A system configured to:
acquire a digital image that captures an environment containing at least a first subject;
segment a first portion of the digital image depicting the first subject into a plurality of superpixels;
for each superpixel of the plurality of superpixels:
assign a semantic label to the superpixel,
extract features of the superpixel, and
determine a measure of similarity between the features extracted from the superpixel and features extracted from a reference superpixel identified in a reference digital image, wherein the reference superpixel has a reference semantic label that matches the semantic label assigned to the superpixel; and
determine, based on the measures of similarity associated with the plurality of superpixels, that the first subject is depicted in the reference image.

14. The system of claim 13, wherein the digital image captures a scene containing a plurality subjects that includes the first subject, and the system further comprises instructions to segment the digital image into a plurality of portions that each depicts a different subject of the plurality of subjects.

15. At least one non-transitory computer-readable medium comprising instructions that, in response to execution of the instructions by one or more processors, cause the one or more processors to perform the following operations:
acquiring a digital image that captures an environment containing at least a first subject;
segmenting a first portion of the digital image depicting the first subject into a plurality of superpixels;
for each superpixel of the plurality of superpixels:
assigning a semantic label to the superpixel,
extracting features of the superpixel, and
determining a measure of similarity between the features extracted from the superpixel and features extracted from a reference superpixel identified in a reference digital image, wherein the reference superpixel has a reference semantic label that matches the semantic label assigned to the superpixel; and
determining, based on the measures of similarity associated with the plurality of superpixels, that the first subject is depicted in the reference image.

\* \* \* \* \*